Figure 1:
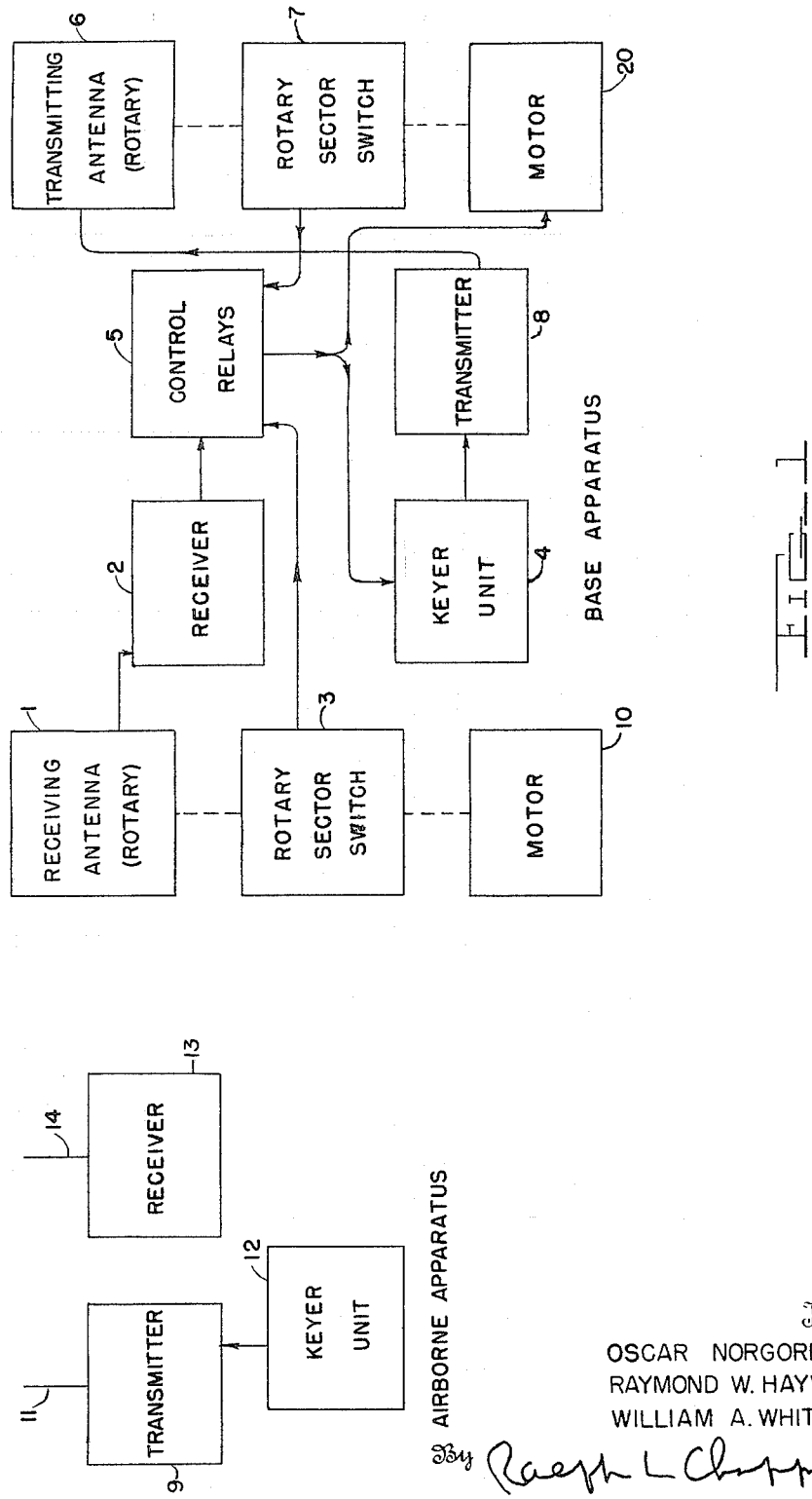

Dec. 6, 1966   O. NORGORDEN ETAL   3,290,683
AIRCRAFT HOMING SYSTEM
Filed Oct. 25, 1945   2 Sheets-Sheet 1

Inventors
OSCAR NORGORDEN
RAYMOND W. HAYWARD
WILLIAM A. WHITE
By Ralph L Chappell
Attorney

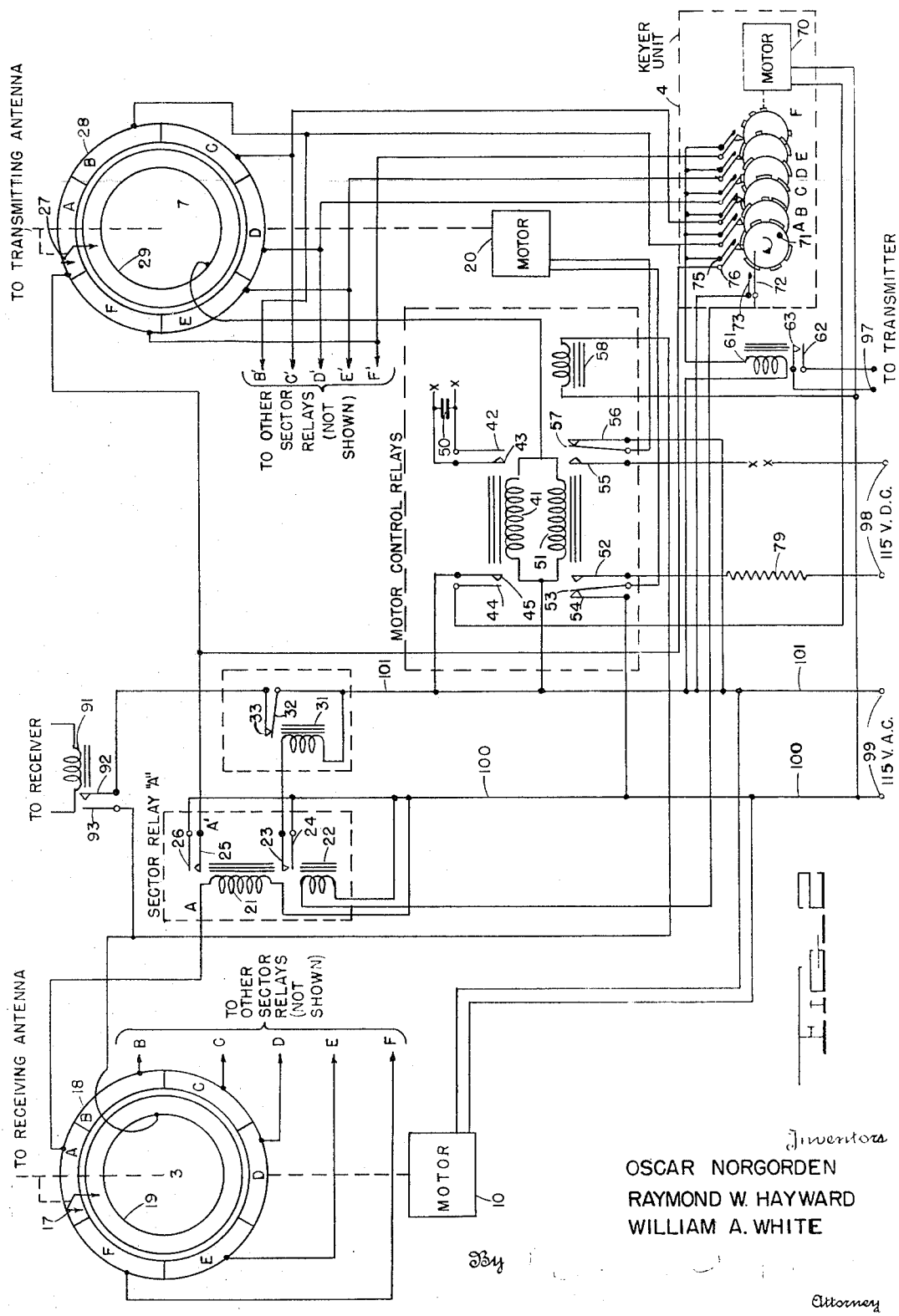

United States Patent Office 3,290,683
Patented Dec. 6, 1966

3,290,683
AIRCRAFT HOMING SYSTEM
Oscar Norgorden and William A. White, both c/o Naval Research Lab, Anacostia Station, Washington, D.C., and Raymond W. Hayward, c/o Bureau of Naval (Enlisted) Personnel, Navy Department, Washington, D.C.
Filed Oct. 25, 1945, Ser. No. 624,629
4 Claims. (Cl. 343—100)

The invention described herein may be manufactured and used by or for the Government for governmental purposes without the payment of any royalty thereon.

This invention relates to aircraft homing systems; in particular it is directed to providing a radio system adapted for military use which will successfully guide aircraft to a base while affording a maximum of radio security to both aircraft and base.

Two types of homing system are in general use. In one type a continuously-operative transmitter at the base transmits coded beacon signals from a rotating directional antenna. The 360° azimuth is arbitrarily divided into a number of sectors and the transmitter keying system is synchronized with the antenna so that while the antenna sweeps a given sector, the transmitter sends out a particular code sign. This homing system has the disadvantage, from the military viewpoint, of affording virtually no radio security for the base, since the transmitter is continuously operative and the signal can be detected from any direction at some part of each antenna revolution.

The other type of homing system in general use is actuated by echo-ranging apparatus aboard the aircraft. A transmitter at the base, coupled to a non-directive radiator, is triggered by the radio impulses from the plane's echo-ranging apparatus and in response thereto the base transmitter sends out answering radio impulses.

These impulses can be detected by a directional receiving antenna on the aircraft and bearing information thereby derived.

In both the systems heretofore generally used, radio security for the base is almost wholly lacking. In this invention, a system is provided wherein the transmissions from the base are very brief in duration, are not systematically repetitive, and are confined to a narrow directive beam. One of the objects of this invention is to provide an aircraft homing system wherein radio transmissions from the airbase are confined to the direction of the aircraft desiring bearing information.

Another object of this invention is to provide an aircraft homing system wherein radio transmissions from the air base are confined to those times when an aircraft actually requests bearing information.

A further object of this invention is to provide a wholly automatic aircraft homing system affording a high degree of radio security to the air base.

In the homing system comprising this invention, a direction-finding receiver is continuously operative on the air base, searching in all directions for interrogation signals. When the pilot of an aircraft desires information as to the bearing of the air base, he actuates his interrogation transmitter and a single dash of perhaps one or two seconds duration is transmitted. The receiver at the base intercepts this signal, automatically adjusts a directional transmitting antenna to the proper position to radiate toward the interrogating aircraft, and then a transmitter on the airbase is caused automatically to transmit a code of a few seconds duration, which will give the inquiring pilot the information desired. No further signals are transmitted from the airbase until another interrogating signal is received, at which time the transmitting antenna is automatically reoriented to answer the new interrogation and another coded reply is sent out.

Disclosure of the invention may best be made with reference to the appended drawings, of which FIGURE 1 is a block diagram showing the interrelation of the various components of the invention; and FIGURE 2 is a schematic diagram showing the circuit connections of some of the components in a typical embodiment of the system.

FIGURE 1 shows, as components of apparatus to be airborne by aircraft flying from the base, a transmitter 9, coupled to a nondirectional transmitting antenna 11, and a receiver 13 coupled to a non-directional antenna 14. Keyer unit 12 is employed to key transmitter 9. All the airborne components may be conventional in character; the keyer unit may be any relay apparatus responsive to control by the pilot, operative to cause transmitter 9 to radiate a continuous signal for a second or two when the pilot desires bearing information. The frequency of the signal from transmitter 9 may have any predetermined value; the frequency to which receiver 13 is tuned should be that of the signal radiated by transmitter 8 at the airbase. These frequencies would normally be somewhere in the U.H.F. spectrum.

At the airbase the receiving apparatus comprises a receiver 2, a rotatable directional receiving antenna system 1, a sector switch 3, having a movable component rotatable in synchronism with the antenna, and a motor 10. Motor 10 is operative to rotate the antenna and the movable component of the sector switch continuously at a suitable speed, which might be thirty to sixty revolutions per minute. The sector switch will be hereinafter described in detail in connection with FIGURE 2; the details of the antenna and receiver are not critical so long as they are operative to indicate bearing of a received signal by producing a voltage impulse when the antenna 1 is at some critical orientation. A receiving and direction-finding apparatus well suited for employment as a component of this invention is disclosed in detail in our co-pending application entitled "Radio Direction Finder," S.N. 624,920 now U.S. Patent No. 2,710,960 dated June 14, 1955. Receiver 2 is of course tuned to the frequency of airborne transmitter 9.

The output of receiver 2 is applied to a relay circuit shown in FIGURE 1 as block 5, marked "control relays." This relay circuit will be hereinafter described in detail. The transmitter components of the airbase apparatus comprise a radio transmitter 8, a keyer unit 4, a rotary directional transmitting antenna 6, a rotary sector switch 7 rotatable in synchronism with antenna 6, and an induction motor 20 coupled mechanically to the antenna and sector switch. Transmitter 8, antenna 6, and motor 20 may be conventional; the other components will be described in detail in later paragraphs. The sector switches 3 and 7 feed bearing data to the control relays 5, which in turn control motor 20 and keyer unit 40.

FIGURE 2 shows in schematic form the circuit details of sector switches 3 and 7, control relays 5, and keyer unit 4. Sector switch 3 comprises a stationary slip ring 19 and a stationary segmented commutator ring 18 mounted concentrically. A shorting brush 17, is mechanically coupled to the rotary receiving antenna so that it will turn in synchronism with the antenna, and is positioned to bridge the slip ring 19 and the commutator 18 to electrically connect the slip ring 19 to successive segments of commutator ring 18. The segments of ring 18 correspond to sectors in which the 360° of azimuth are arbitrarily divided. The number of sectors chosen will depend on the requirements of the application; twelve 30° sectors or eighteen 20° sectors might be normal. In this drawing, to avoid excessive circuit complication, the switch is shown as having six 60° sectors denoted respectively A, B, C, D, E, and F. An examination of FIGURE 2, with the description following, will make clear the circuit modifications necessary to construct a system having a greater number of sectors. Motor 10 operates continuously while the system is in operation; it is mechanically coupled to the receiving antenna and the rotary brush 17 so as to cause them to turn in synchronism.

Sector switch 7, mechanically coupled to turn in synchronism with the transmitting antenna, is identical to switch 3, the components of switch 7 being slip ring 29, segmented commutator 28, and rotary shorting brush 27.

Switches 3 and 7 are mechanically coordinated in a manner best illustrated by an example. Suppose, when the direction-finding system produces a bearing indication on a signal from a particular aircraft, the receiving antenna is so oriented that brush 17 is on sector "A." The switches are so coordinated that if the transmitting antenna be rotated until the sliding brush 27 of sector switch 7 is on sector A, the direction of best radiation from transmitting antenna will then be toward the signalling aircraft.

The control relays unit, designated 5 on FIGURE 1, contains a number of relays of various types. Before the circuit is described, the characteristics of the various relays will be specified.

Relay 91 is a single pole single throw relay, normally open and spring-biased to stay open except when the magnet coil has current flowing in it. Since the coil of relay 91 is energized by output pulses from the receiver, it should be a sensitive, low-current type.

Relay 31 is a single pole, single throw, normally closed type of relay, spring biased to stay closed except when the magnet coil is energized.

Relay 21 is designated sector relay "A" on the drawing. It is illustrative of the sector relays, of which there is one for each segment of commutator 18. All the sector relays are of the same type; they are two-pole, single throw relays, normally open but equipped with a mechanical catch which, once the coil has closed the contacts, keeps them closed until the catch is disengaged from the relay armature by the energizing of an auxiliary release coil. The release coil for relay 21 is coil 22.

Relay 41 is a double pole, single throw relay, normally open and spring-biased to remain open except while the magnet coil is energized.

Relay 51, the principal motor control relay, is a double-pole, double-throw relay having the same type of movement as relay 21, that is, once the contacts have been thrown from the normal position to the other, the contacts remain in the new position until a release coil is energized. Coil 58 is the release coil of relay 51.

Relay 61 is the transmitter keying relay. It is a single-pole, single-throw device, spring biased to remain open except when the magnet coil is energized.

The coils of all the above-mentioned relays except relay 91 are in this embodiment designed to operate on 115-volt A.-C. power.

The keyer unit 4 comprises code wheels equal in number to the azimuth sectors chosen. In this embodiment of the invention there are six wheels, denoted A to F inclusive to indicate the sector with which each is associated. The rim of each wheel contains a series of protuberances arranged around the rim to form the dots and dashes of telegraphic code groups. Each wheel is differently coded; that is, the protuberances on one wheel may form the letters "OO" while the next may form the group "KK," etc. The wheels are concentrically affixed to a common rotatable shaft.

Mounted adjacent the rim of each wheel is a switch comprising a fixed contact and a movable contact having an insulated projection resting on the wheel rim. The switch is normally open but will close when the insulated projection engages a protuberance on the wheel rim. In addition to the rim protuberances described, one of the wheels has on its side a small projection or finger 71 extending at right angles to the plane of the wheel. Once each rotation of the wheel, this finger engages the movable arm of another switch and closes it momentarily. The contacts of the last mentioned switch are denoted 72, 73 in the drawing. Motor 70 is mechanically coupled to the code wheel shaft in such manner that when the motor is operative, the code-wheels rotate together at a slow speed, perhaps two or three r.p.m.

The two conductors leading from the 115-volt A.-C. power source 99 which energizes the relays and motors are denoted on the drawings 100 and 101 respectively. The circuit diagram shown on FIGURE 2 is complete except that only sector relay "A" is shown in detail. The actual apparatus represented in FIGURE 2 has six sector relays; the appropriate connections to the other relays are indicated, but to prevent the figure from becoming excessively complicated, the other relays are not shown.

The slip ring 19 of sector switch 3 is connected to contact 93 of relay 91; contact 92 of relay 91 is connected through the normally-closed contacts of relay 31 to conductor 101. Segment "A" on commutator 18 is connected to terminal "A" of relay 21, which is one side of the main magnet coil. The other side of the magnet coil of relay 21 is connected to conductor 100. One side of the magnet coil of relay 31 is connected to line 101; the other side is connected to contact 23 on relay 21. Contact 24 is connected to line 100. Of the other pair of contacts on relay 21, the contact 26 goes to conductor 100, while contact 25, also denoted "A," is connected to the "A" segment of commutator 28 on sector switch 7. Motor 10, which turns the receiving antenna, is connected across power source 99; that is, its terminals are connected respectively to conductors 100 and 101.

The magnet coils of relays 41 and 51 are connected in parallel; one side of the parallel combination goes to slip ring 29 on sector switch 7 and the other side is connected to conductor 101. Contact 44 on relay 41 is connected to one terminal of keying motor 70; contact 45 goes to conductor 101. The other terminal of motor 70 is connected to terminal 100. Condenser 50 is connected across the other pair of contacts on relay 41; of this pair, contact 42 is connected to one side of D.-C. source 98 while contact 43 goes to contact 55 on relay 51. Contact 52 on relay 51 is connected through resistor 79 to the other side of D.-C. source 98. Contact 54 on relay 51 goes to conductor 100; contact 56 goes to conductor 101. The movable contacts 53 and 57 on relay 51 are connected respectively to the terminals of motor 20, which is mechanically coupled to the transmitting antenna.

The fixed contacts on all the keying switches are connected together and are connected to one side of the magnet coil on keying relay 61, the other side of that coil being connected to line 101. The movable contact of each keying switch is connected to its corresponding segment on commutator 28. The keying switch contacts for sector "A" are denoted 75 and 76 on the drawing. Contacts 62 and 63 of keying relay 61 are connected respectively to output terminals 97, which should be connected in appropriate manner to key the beacon transmitter 8.

One side of release coil 58 of relay 51 is connected to conductor 100; the other side is connected to slip ring 19 on sector switch 3. One side of release coil 22 of sector switch 21 is connected to conductor 100, the other side is connected to contact 72 of the switch operated by projection 71. Contact 73 of that switch is connected to conductor 101.

Those sector relays not shown on the drawing are connected in this manner: The leads marked "B," "C," "D," "E," and "F" on the diagram go to those terminals on the magnet coils of the other sector relays which correspond in each case to terminal "A" on relay 21. The leads marked "B'," "C'," "D'," "E'," and "F'" go to those terminals on the other relays which correspond to contact 25, marked "A'" on relay 21. In all other respects the other sector relays are wired into the circuit exactly as is relay 21; that is, the other sector relay connections are common to all the relays.

When the system is first placed in operation on an airbase, the sector relays should all be placed in their normally open position and relay 51 should be set so that its armature is down and is being held in place by the catch aforementioned. Once this has been done, the system resets itself automatically after each cycle of operation.

The sequence of events upon receipt of an interrogation signal is as follows: Suppose the interrogation signal is coming form sector "A"; then, when the impulse from the receiver closes relay 91, the shorting brush 17 of switch 3 will be on segment "A" of commutator 18. When relay 91 closes, relay 21 is therefore energized; its contacts close and stay closed. The closing of contacts 23 and 24 energizes relay 31, opening its contacts and taking the A.-C. power off the sector relay circuit, thus preventing other interrogations from having any effect until after the first has been answered. The closure of relay 91 also energizes release coil 58 of relay 51, which allows contacts 53 and 57 to close with contacts 54 and 56, thus applying 115 v. A.-C. power to motor 20 and initiating rotation of the transmitting antenna.

When the transmitting antenna reaches the correct position to reply to the interrogation, sliding brush 27 will reach segment "A" on commutator 28, and as a result relays 41 and 51 will be energized. Contacts 44 and 45 close and start keying motor 70. Contacts 53 and 57 are thrown into contact with contacts 52 and 55 respectively and contacts 42 and 43 close simultaneously therewith; the result is that the A.-C. power is removed from motor 20 and D.-C. is applied thereto, very abruptly braking motor 20 and stopping the transmitting antenna at the proper position. Keying motor 70 turns the keying wheels and causes the transmitter to send out the appropriate code for sector "A." When the keying wheels have completed one revolution, projection 71 momentarily closes contacts 72 and 73; release coil 22 on relay 21 is energized and the contacts on relay 21 open. As a result the keying motor stops, the contacts on relay 31 close again, relays 41 and 51 are de-energized, the D.-C. is removed from motor 20, and the system is ready to respond to another interrogation. In a practical construction the average time required for the entire cycle to be completed was about one minute and the total time the transmitter is operative in answering an interrogation in no event exceeds a few seconds, the exact time being determined by the time required for the keying wheels to complete one revolution.

From a pilot's viewpoint the result of the just-described series of operations is that he transmits an interrogation signal from his plane and a few seconds thereafter hears in his headphones the code signal from the base transmitter which informs him of the bearing of his base. The duration of both interrogation and answering signals is very small, and the answering signal is sent only in a beam toward the inquiring aircraft. Hence, a high degree of radio security is maintained from both aircraft and base.

It will be understood that the embodiment of the invention herein described is exemplary only and that the scope of the invention is to be determined by the appended claims.

What is claimed is:

1. In a navigational device, a unidirectional receiving means, means for orienting said receiving means to different directions in successive time intervals, means connected to said receiving means and responsive to received signals for generating a control signal occurring in a respective one of said successive time intervals, a directive transmitting antenna rotatably mounted for orientation in a desired direction, and means responsive to said control signal for orienting said transmitting antenna in the direction associated with the time interval in which said control signal occurs.

2. In a navigational device, a unidirectional receiving means, means for rotating said receiving means to different directions in successive time intervals, means connected to said receiving means and responsive to received energy for generating a control signal occurring in a respective one of said successive time intervals, a directive transmitting antenna rotatably mounted for orientation in a desired direction, a transmitter connected to said transmitting antenna, signal generating means connected to said transmitter for providing intelligence signals, and means responsive to said control signal for activating said signal generating means and for orienting said transmitting antenna in the direction associated with the time interval in which the control signal occurs.

3. In a navigational device, unidirectional receiving means, means for rotating said receiving means to different directions in successive time intervals, first means connected to said receiving means and responsive to received energy for providing a first control signal, means connected to said receiving means and responsive to said first control signal for providing a second control signal, said second control signal occurring in a respective one of said successive time intervals, a directive transmitting antenna rotatably mounted for orientation in a desired direction, rotating means connected to said transmitting antenna for rotating the same, means responsive to said first control signal for initiating operation of said rotating means, and means connected to said transmitting antenna and responsive to said second control signal for terminating operation of said rotating means.

4. In a navigational device, unidirectional receiving means, means for rotating said receiving means to different directions in successive time intervals, first means connected to said receiving means and responsive to received energy for providing a first control signal, means connected to said receiving means and responsive to said first control signal for providing a second control signal, said second control signal occurring in a respective one of said successive time intervals, a directive transmitting antenna rotatably mounted for orientation in a desired direction, rotating means connected to said transmitting antenna, means responsive to said first control signal for initiating operation of said rotating means, a transmitter connected to said transmitting antenna, signal generating means connected to said transmitter, and means responsive to said second control signal for initiating operation of said signal generating means and for terminating operation of said rotating means.

References Cited by the Examiner
UNITED STATES PATENTS

| | | | |
|---|---|---|---|
| 2,132,599 | 10/1938 | Baumann | 250—11.3 |
| 2,234,244 | 3/1941 | Gossel | 343—100 |
| 2,248,215 | 7/1941 | Budenbom | 250—1.60 |
| 2,252,083 | 8/1941 | Luck | 250—1.72 |
| 2,257,319 | 9/1941 | Williams | 343—100 |
| 2,257,320 | 9/1941 | Williams | 250—11.36 |
| 2,321,698 | 6/1943 | Nolde | 250—11.3 |
| 2,411,520 | 11/1946 | Capen | 250—1.60 |
| 2,412,612 | 12/1946 | Godet | 250—11.201 |
| 2,433,381 | 12/1947 | Marchand | 343—108 X |
| 2,448,016 | 8/1948 | Busignies | 343—107 X |
| 2,607,915 | 8/1952 | Norgorden | 343—107 |

CHESTER L. JUSTUS, *Primary Examiner.*

MELVIN H. FRIEDMAN, SIMON YAFFEE,
*Examiners.*

NORMAN H. EVANS, R. E. BERGER,
*Assistant Examiners.*